US012227719B2

(12) United States Patent
Arif et al.

(10) Patent No.: US 12,227,719 B2
(45) Date of Patent: Feb. 18, 2025

(54) LIQUID CONCENTRATED SURFACTANT COMPOSITIONS

(71) Applicant: Pilot Chemical Corp., West Chester, OH (US)

(72) Inventors: Shoaib Arif, Mason, OH (US); Robert E. Golden, Wyoming, OH (US)

(73) Assignee: Pilot Chemical Corp., West Chester, OH (US)

( * ) Notice: Subject to any disclaimer, the term of this patent is extended or adjusted under 35 U.S.C. 154(b) by 489 days.

(21) Appl. No.: 17/603,863

(22) PCT Filed: Apr. 17, 2020

(86) PCT No.: PCT/US2020/028829
§ 371 (c)(1),
(2) Date: Oct. 14, 2021

(87) PCT Pub. No.: WO2020/214996
PCT Pub. Date: Oct. 22, 2020

(65) Prior Publication Data

US 2022/0298452 A1 Sep. 22, 2022

Related U.S. Application Data

(60) Provisional application No. 62/899,448, filed on Sep. 12, 2019, provisional application No. 62/835,727, filed on Apr. 18, 2019.

(51) Int. Cl.

| | |
|---|---|
| ***C11D 1/00*** | (2006.01) |
| ***C11D 1/94*** | (2006.01) |
| ***C11D 3/04*** | (2006.01) |
| ***C11D 3/20*** | (2006.01) |
| ***C11D 3/30*** | (2006.01) |

(Continued)

(52) U.S. Cl.
CPC ................ *C11D 1/94* (2013.01); *C11D 3/044* (2013.01); *C11D 3/2044* (2013.01); *C11D 3/30* (2013.01); *C11D 1/22* (2013.01); *C11D 1/62* (2013.01); *C11D 1/72* (2013.01); *C11D 1/90* (2013.01); *C11D 2111/12* (2024.01); *C11D 2111/20* (2024.01); *C11D 2111/24* (2024.01)

(58) Field of Classification Search
None
See application file for complete search history.

(56) References Cited

U.S. PATENT DOCUMENTS

| | | | | |
|---|---|---|---|---|
| 4,430,236 A * | 2/1984 | Franks | ................ | C11D 3/0015 510/303 |
| 5,916,862 A | 6/1999 | Morelli et al. | | |

(Continued)

OTHER PUBLICATIONS

Copenheaver, Blaine R.; International Search Report and Written Opinion of the International Searching Authority, issued in International Patent Application No. PCT/US2020/028829; Jun. 19, 2020; 12 pages.

*Primary Examiner* — Necholus Ogden, Jr.
(74) *Attorney, Agent, or Firm* — Frost Brown Todd LLP

(57) ABSTRACT

Liquid concentrated surfactant compositions including an anionic surfactant, a non-ionic surfactant, and a cationic surfactant are disclosed. The liquid concentrated surfactant compositions are substantially free of any water or solvent and consist substantially of the surfactants. The liquid concentrated surfactant compositions are effective as cleaning compositions.

16 Claims, 1 Drawing Sheet

(51) Int. Cl.

| | |
|---|---|
| *C11D 1/22* | (2006.01) |
| *C11D 1/62* | (2006.01) |
| *C11D 1/72* | (2006.01) |
| *C11D 1/90* | (2006.01) |

(56) References Cited

U.S. PATENT DOCUMENTS

| | | | | |
|---|---|---|---|---|
| 6,475,970 | B1 | 11/2002 | Del Duca et al. | |
| 6,630,434 | B2 | 10/2003 | Besse et al. | |
| 6,846,793 | B1 * | 1/2005 | Griese | C11D 17/0021 510/201 |
| 7,482,315 | B2 * | 1/2009 | Levitt | C11D 1/65 510/424 |
| 2011/0105661 | A1 | 5/2011 | Aksman | |
| 2018/0037792 | A1 * | 2/2018 | Champagne | C09K 8/40 |

* cited by examiner

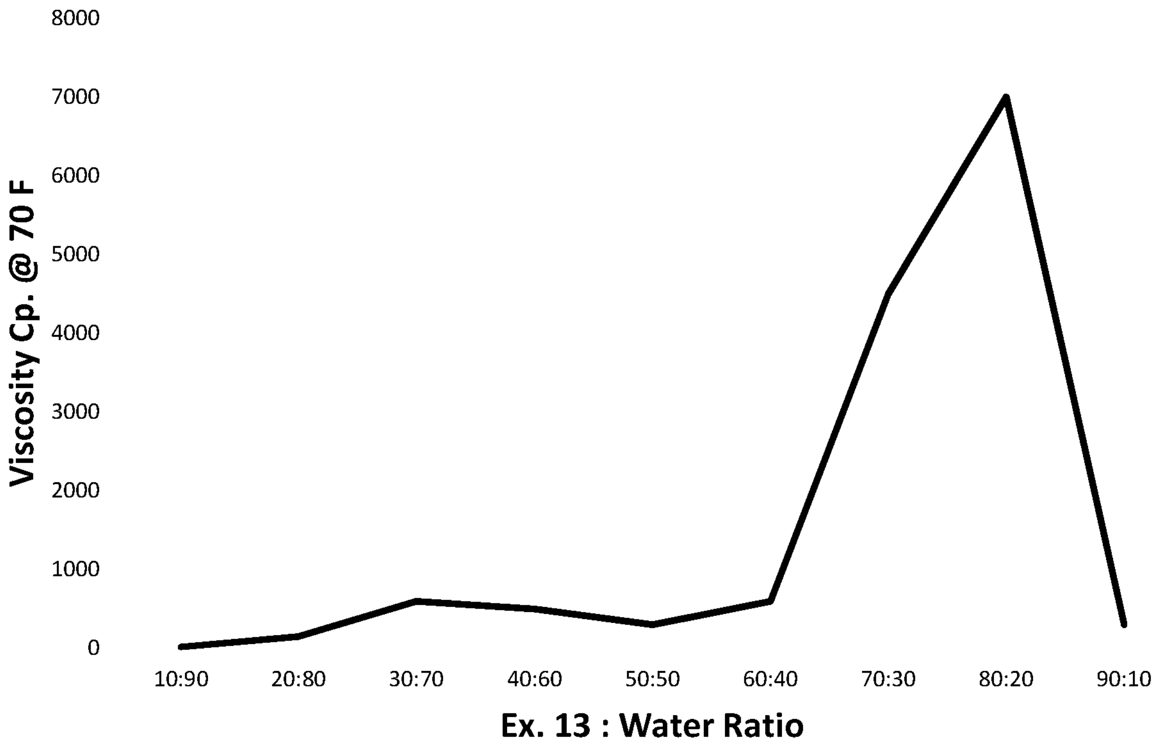
8000
7000
6000
5000
4000
3000
2000
1000
0
Viscosity Cp. @ 70 F
10:90
20:80
30:70
40:60
50:50
60:40
70:30
80:20
90:10
Ex. 13 : Water Ratio

LIQUID CONCENTRATED SURFACTANT COMPOSITIONS

CROSS-REFERENCE TO RELATED APPLICATIONS

The present application is a United States national stage entry under 35 U.S.C. § 371 of international patent application number PCT/US2020/028829, filed Apr. 17, 2020, which claims the priority benefit of U.S. provisional patent application No. 62/835,727, filed Apr. 18, 2019, and U.S. provisional patent application No. 62/899,448, filed Sep. 12, 2019, each of which is incorporated by reference herein in their respective entireties.

TECHNICAL FIELD

The present disclosure generally relates to liquid concentrated surfactant compositions substantially free of water and including at least an anionic surfactant, a non-ionic surfactant, and a cationic surfactant.

BACKGROUND

Surfactants are widely used in many industries for the unique properties they exhibit. For example, cleaning compositions typically include a blend of surfactants, dispersed in water or other solvent, to provide cleaning benefits. In such compositions, the surfactants act as a primary cleaning component to solubilize and remove oil, dirt, and other undesirable soils exposed to the composition. Typically, cleaning compositions include multiple surfactants, such as an anionic surfactant and a non-ionic surfactant, as the use of multiple surfactants can improve removal of different types of soils. In addition to cleaning, surfactant-containing compositions can also be useful for other applications such as the formation of emulsions, biocides, inks, and paints. Surfactant-containing compositions are also useful for enhanced oil recovery applications, foaming applications, metal working, and many other uses.

SUMMARY

According to one embodiment, a liquid composition includes one or more anionic sulfonated surfactants, one or more non-ionic surfactants, and one or more hydrophilic cationic surfactants. The liquid composition is about 90% or more, by weight, surfactant.

According to another embodiment, a liquid composition consists essentially of one or more anionic sulfonated surfactants, one or more non-ionic surfactants, one or more hydrophilic cationic surfactants, and optionally one or more of propylene glycol and an amphoteric surfactant. The liquid composition is about 90% or more, by weight, surfactant.

According to another embodiment, a method of forming a liquid concentrated surfactant composition includes mixing together until substantially clear and homogenous one or more anionic sulfonated surfactants, one or more non-ionic surfactants, and one or more hydrophilic cationic surfactants. The liquid concentrated surfactant composition is about 90% or more, by weight, surfactant.

BRIEF DESCRIPTION OF THE DRAWINGS

FIG. 1 depicts a graph illustrating the viscosity of a concentrated liquid surfactant composition as a function of aqueous dilution percentage.

DETAILED DESCRIPTION

The present disclosure generally discloses liquid concentrated surfactant compositions substantially free of any water and including at least an anionic surfactant, a non-ionic surfactant, and a cationic surfactant. Although generally useful for any application which requires the use of surfactants, the liquid concentrated surfactant compositions described herein are particularly useful as concentrated cleaning compositions for the removal of various soils. Generally, the liquid concentrated surfactant compositions are formed by selecting suitable surfactants that are available in compositions which are substantially 100%, by weight, surfactant, and then mixing the compositions together.

Definitions

The term "surfactant" as used herein refers to surface active agents. Surfactants are generally amphiphilic compounds which decrease surface or interfacial tensions. The term "surfactant" includes reference to all forms of the surfactant, including surfactant salts, and reference to the weight percentage of a surfactant includes the complete weight of the specified form such as chelants and/or the counterion of any surfactant salts.

The term "anionic surfactant" as used herein refers to a surfactant wherein the hydrophilic or polar group has an anionic charge.

The term "non-ionic surfactant" as used herein refers to a surfactant wherein the hydrophilic or polar group does not have an ionic charge.

The term "cationic surfactant" as used herein refers to a surfactant wherein the hydrophilic or polar group has a cationic charge.

The term "soil" as used herein refers to undesired contaminants such as dirt, oil, food, biological contaminant, etc. Soils can be removed from a substrate and solubilized by surfactants.

The term "% active" as used herein refers to the weight percentage of the active components in the referenced item. For example, a 95% active composition refers to a composition including 95%, by weight, active components and about 5%, by weight, inert components.

The term "active component" refers to all components in a composition other than the inert components. Inert components refers to components such as water, solvent, or filler.

The term "liquid concentrated surfactant composition" refers to a composition formed of about 100%, by weight, surfactant and explicitly includes compositions formed of 90% or more, by weight, surfactant; about 91% or more, by weight, surfactant; about 92% or more, by weight, surfactant; about 93% or more, by weight, surfactant; about 94% or more, by weight, surfactant; about 95% or more, by weight, surfactant; about 96% or more, by weight, surfactant; about 97% or more, by weight, surfactant; about 98% or more, by weight, surfactant; about 99% or more, by weight, surfactant; about 100%, by weight, surfactant; and 100%, by weight, surfactant. In certain embodiments, the remainder of the liquid concentrated surfactant composition can include minor amounts of additives, trace components, and/or inadvertent amounts of inert components. In certain embodiments, the liquid concentrated surfactant compositions can include about 5% or less inert components; about 3% or less inert components; about 1% or less inert components; or substantially no inert components. Unless stated otherwise, references to the pH of the liquid concentrated surfactant composition refer to the pH of a composition formed of 10%, by weight, of the liquid concentrated surfactant composition and 90%, by weight, of deionized water.

The term “substantially free of” means that the specified component is not intentionally included in the composition and if present, is found only in incidental amounts of about 5% or less.

The term HCPA DCC-17 means the Tough Greasy Kitchen Soil Test Method for Evaluating Cleaners Used to Clean Hard Surfaces evaluation standard promulgated by the Household and Commercial Products Association (“HCPA”) under Designation DCC-17 (April 2018). ASTM D5343 refers to ASTM International evaluation standard D5343 (2018).

Surfactants for the liquid concentrated surfactant composition disclosed herein can be selected based on their compatibility with the other surfactants included in the composition as well as their physical and chemical properties. As used herein, “compatibility” means that the surfactants are miscible together and that no precipitation, flocculation, phase separation, etc., occurs from, for example, the formation of a salt or other ionic complex.

With respect to physical and chemical properties, suitable surfactants can preferably be formed, or supplied, as a liquid composition that is about 100%, by weight, surfactant, or a salt or other derivative form thereof, as such surfactants can readily be processed into the desired liquid concentrated surfactant composition with low processing energy. In certain embodiments, preferred surfactant compositions including about 100%, by weight, surfactant can be liquid at a temperature of about 5° C. to about 50° C., or any temperature between about 5° C. to about 50° C., such as about 15° C. to about 30° C., and at room temperature (e.g., at about 23° C.). As can be appreciated however, suitable surfactants can also be an about 100%, by weight, gel or solid if interaction with the other surfactants in the liquid concentrated surfactant composition will cause the surfactant to form a liquid in the liquid concentrated surfactant composition. As can be appreciated, suitable compositions of the surfactants used to form the liquid concentrated surfactant compositions described herein can include small quantities of solvent or other compounds in certain embodiments. For example, a composition formed of less than 100%, by weight, surfactant, can be suitable if the liquid concentrated surfactant composition formed thereof maintains a sufficient weight percentage of surfactant (e.g., 90% or more, by weight, surfactant).

In certain embodiments, suitable anionic surfactants can be selected from sulfonated surfactants and related compounds thereof. For example, suitable sulfonated surfactants can be selected from both sulfonates and the related sulfonic acids used to form such sulfonates. In certain embodiments, the anionic surfactant can include an aromatic moiety, such as a phenyl moiety, which can be independently substituted with a sulfonic acid moiety, and can be further independently substituted with one or more linear or branched $C_4$-$C_{24}$ alkyl groups. For example, the anionic surfactant can include an alkylbenzene sulfonate (such as represented by Formula I) or a sulfonic acid precursor thereof:

Formula I

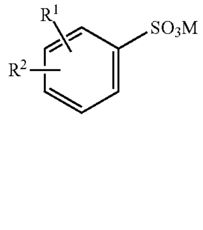

wherein:

$R^1$—represents a hydrogen, or a linear or branched $C_4$-$C_{24}$ alkyl;

$R^2$—represents a hydrogen, or a linear or branched $C_4$-$C_{24}$ alkyl;

M—represents an alkali metal, an ammonium represented by $N(R^4)_4$, a $C_1$-$C_6$ alkanol or $C_1$-$C_6$ alkoxylated aminoalcohol, or $SO_3M$ is $SO_3H$; wherein each $R^4$ independently represents a hydrogen, or a linear or branched $C_1$-$C_6$ alkyl; and wherein at least one of $R^1$ and $R^2$ represents a linear or branched $C_4$-$C_{24}$ alkyl.

The one or more linear or branched $C_4$-$C_{24}$ alkyl groups of the anionic sulfonated surfactant can be, or can include, mixtures of, a linear or branched $C_4$-$C_8$ alkyl, a $C_6$-$C_{10}$ alkyl, a $C_8$-$C_{14}$ alkyl, a $C_{12}$-$C_{16}$ alkyl, a $C_{14}$-$C_{18}$ alkyl, a $C_{16}$-$C_{20}$ alkyl, and/or a $C_{18}$-$C_{24}$ alkyl. For example, in certain embodiments, the groups $R^1$ and $R^2$ of the anionic sulfonated surfactant represented by Formula I can represent a linear or branched $C_6$-$C_{24}$ alkyl, such as a linear or branched $C_4$-$C_8$ alkyl, a linear or branched $C_6$-$C_{10}$ alkyl, a linear or branched $C_8$-$C_{14}$ alkyl, a linear or branched $C_{12}$-$C_{16}$ alkyl, a linear or branched $C_{14}$-$C_{18}$ alkyl, a linear or branched $C_{16}$-$C_{20}$ alkyl, and/or a linear or branched $C_{18}$-$C_{24}$ alkyl, or mixtures thereof. In certain embodiments, the groups $R^1$ and/or $R^2$ of the anionic sulfonated surfactant represented by Formula I can represent a linear $C_6$-$C_{24}$ alkyl, such as a linear $C_4$-$C_8$ alkyl, a linear $C_6$-$C_{10}$ alkyl, a linear $C_8$-$C_{14}$ alkyl, a linear $C_{12}$-$C_{16}$ alkyl, a linear $C_{14}$-$C_{18}$ alkyl, a linear $C_{16}$-$C_{20}$ alkyl, and/or a linear $C_{18}$-$C_{24}$ alkyl, or mixtures thereof.

In certain embodiments, the groups $R^1$ and/or $R^2$ of the anionic sulfonated surfactant represented by Formula I can represent a branched $C_6$-$C_{24}$ alkyl, such as a branched $C_4$-$C_8$ alkyl, a branched $C_6$-$C_{10}$ alkyl, a branched $C_8$-$C_{14}$ alkyl, a branched $C_{12}$-$C_{16}$ alkyl, a branched $C_{14}$-$C_{18}$ alkyl, a branched $C_{16}$-$C_{20}$ alkyl, and/or a branched $C_{18}$-$C_{24}$ alkyl, or mixtures thereof. The salt of the one sulfonic acid moiety of the anionic sulfonated surfactant (for example, wherein at least one of the moieties represented by $SO_3M$ is not $SO_3H$) or the amphoteric sulfonated surfactant contained within the sulfonated surfactant composition can be an alkali metal salt (such as a sodium salt (e.g., wherein M is Na) or potassium salt (e.g., wherein M is K)), an ammonium salt (e.g., wherein M represents $N(R^4)_4$), or an aminoalcohol salt.

In certain embodiments, the anionic surfactant can be a linear or branched alkylbenzene sulfonate (sometimes referred to as alkylamine alkylbenzene sulfonate or an alkylammonium alkylbenzene sulfonate). Examples of such alkylbenzene sulfonates include linear or branched hexylbenzene sulfonate, linear or branched dodecylbenzene sulfonate, isopropylamine linear alkylbenzene sulfonate, isopropylamine branched alkylbenzene sulfonate, isoproylamine linear or branched hexylbenzene sulfonate, isoproylamine linear or branched dodecylbenzene sulfonate, and isopropanolamine linear alkylbenzene sulfonate.

In certain embodiments, the anionic surfactant can be added as a sulfonic acid and can be substantially converted in the liquid concentrated surfactant composition, or in a precursor composition, into a sulfonate.

In certain embodiments, the anionic surfactant can be commercially obtained and can be, for example, an anionic sulfonated surfactant, or anionic sulfonic acid, comprising, or consisting of, a Calsoft®-type or Calimulse®-type surfactant such as a linear or branched alkyl benzene sulfonate or sulfonic acid. Suitable Calsoft® surfactants are sold by the Pilot Chemical Co. (Cincinnati, OH) and include Calsoft® LAS-99 and Calsoft® LPS-99.

In certain embodiments, particularly advantageous anionic surfactants can include, or be formed from, linear alkyl benzene sulfonic acids, such as Calsoft® LAS-99 or Calsoft® LPS-99 which are commercially available as 99% active liquids containing 97%, by weight, linear alkyl benzene sulfonic acid.

Generally, the liquid concentrated surfactant compositions described herein can generally include about 25% to about 75%, by weight, of an anionic sulfonated surfactant or any amount between about 25% to about 60%, by weight, such as about 30% to about 45%, by weight.

In certain embodiments, the liquid concentrated surfactant compositions can include a neutralizing agent to modify the pH of the composition. As can be appreciated, use of such neutralizing agents can also convert any anionic sulfonic acids into an anionic sulfonated surfactant. In certain embodiments, sufficient neutralizing agent can be added to a liquid surfactant composition to adjust the pH to a pH of about 10 or less, a pH of about 8 or less, a pH of about 5 to about 8, or a pH of about 7 to about 8. As can be appreciated however, in certain embodiments, use of a neutralizing agent can be optional such as in embodiments wherein the concentrated liquid surfactant compositions are to be added to compositions already containing a neutralizing agent or intended to be used at a non-neutral pH.

In certain embodiments including a neutralizing agent, preferred neutralizing agents can include amino alcohols. Generally prepared by reacting a secondary amine with a suitable epoxide such as a diepoxide or triepoxide, amino alcohols are useful neutralizing agents with low foaming characteristics.

In certain embodiments, suitable amines for the production of amino alcohols are presented in Formula II:

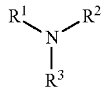

wherein:

- $R^1$ represents an alkoxy chain containing a hydroxy group and formed from one or more reactive additions of a $C_2$-$C_4$ epoxide; and
- $R^2$ and $R^3$ independently represent a hydrogen, a $C_1$-$C_4$ alkyl, or an alkoxy chain containing a hydroxyl group formed from the reactive addition of a $C_2$-$C_4$ epoxide.

In certain embodiments, the neutralizing agent can include one or more of monoisopropanolamine (sometimes referred to as "MIPA") and monoethanolamine. In addition to modifying the pH and converting sulfonic acids into sulfonates, the inclusion of a neutralizing agent can also further enhance the compatibility of the surfactants included in the liquid concentrated surfactant composition with the other surfactants and can enhance the ability of the compositions to remove certain types of soils.

When a neutralizing agent is included, the liquid concentrated surfactant compositions described herein can generally by formed by including about 5% to about 15%, by weight, of the neutralizing agent including any amount between 5% to about 15%, by weight of the neutralizing agent such as about 7% to about 10%, by weight of the neutralizing agent. In certain embodiments, the amount of the neutralizing agent can be determined by reference to the desired pH. For example, sufficient neutralizing agent can be added to form a concentrated liquid surfactant composition having a final pH of about 7 to about 8 when dispersed in deionized water at a concentration of 10%, by weight, liquid composition.

As can be appreciated, the liquid concentrated surfactant compositions described herein may include residual amounts of the neutralizing agent in certain embodiments as the neutralizing agent may not be added in an exact stoichiometric amount to any, for example, sulfonic acid.

As can be appreciated, inclusion of a cationic surfactant improves the performance of the liquid concentrated surfactant composition by providing unique benefits such as fabric softening, biocidal benefits, and improved soil removal. Although cationic surfactants and anionic surfactants typically have compatibility issues leading to the formation of a salt or ionic complex, flocculation, or phase separation, it has been discovered that certain anionic and cationic surfactants can have surprising compatibility.

Specifically, it has been discovered that cationic surfactants having sufficient hydrophilic character can be compatible with sulfonated anionic surfactants. Examples of such cationic surfactants include alkoxylated, preferably ethoxylated, quaternary ammonium compounds formed from fatty acid compounds such as fatty amines. In certain embodiments, more specific examples of suitable cationic surfactants that exhibit suitable hydrophilic character can include alkoxylated, or preferably ethoxylated, polyethylene glycol derivatives of long-chain fatty acid amines such as cocamine and fatty acid tallows. As can be appreciated, the polyethylene glycol groups in such hydrophilic modified cationic surfactants can have the structure depicted in Formula III:

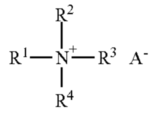

wherein:

- $A^-$ is a suitable anion such as a halogen;
- $R^1$ and $R^2$ are $C_1$-$C_{30}$ linear or branched alkyl, with the number of combined carbon totals at least 8;
- $R^3$ is an alkoxy chain containing a hydroxyl group derived from the reactive addition of a $C_2$-$C_4$ epoxide;
- $R^4$ is hydrogen, a $C_1$-$C_4$ alkyl, or an alkoxy chain containing a hydroxyl group derived from the reactive addition of a $C_2$-$C_4$ epoxide; and
- wherein the combined number of alkoxy units is sufficient to hydrophilically modify the quaternary ammonium compound.

In certain embodiments, suitable quaternary ammonium compounds can be derived from polyethylene glycol. In such embodiments, $R^3$ and $R^4$ can each be:

$$—(CH_2CH_2O)_xH$$

wherein the x of each of $R^3$ and $R^4$ independently represent an integer number between 1 and 15.

Under International Nomenclature Cosmetic Ingredient ("INCI") terminology, a polyethylene glycol ("PEG") constituent can be referred to by the average of the sum of x in $R^3$ and $R^4$. For example, PEG-15 refers to a PEG derivative wherein the average sum of x in $R^3$ and $R^4$ is 15.

In certain embodiments, the cationic surfactant can be a propoxylated cationic surfactant, such as propoxylated quaternary ammonium surfactants and propoxylated amine surfactants. It has been discovered that propoxylated cationic surfactants can allow for the concentrated liquid surfactant compositions described herein to exhibit decreased dioxane content. As can be appreciated, health concerns have prompted regulatory authorities to require decreased amounts of 1,4 dioxane in chemical products. An example of a suitable propoxylated surfactant is polypropoxy diethyl methylammonium chloride. Certain suitable propoxylated surfactants are available from Evonik Industries A.G. (Essen, DE).

In other certain embodiments, a suitable cationic surfactant which is compatible with the sulfonated anionic surfactant is cocoalkylmethyl PEG-15 ammonium chloride. Available as Maquat® C-15 from the Pilot Chemical Co. (Cincinnati, OH), it is advantageously a liquid at a concentration of 95%, by weight, cocoalkylmethyl PEG-15 ammonium chloride at room temperature.

Generally, a suitable cationic surfactant can be included at about 0.5% to about 35%, by weight, of the liquid concentrated surfactant composition including any weight percentages between about 0.5% to about 35% such as about 1% to about 30%, by weight, about 2.5% to about 25%, by weight; about 2.5% to about 10%, by weight; about 3% to about 7.5%, by weight; and about 3% to about 5%, by weight. In certain embodiments, the cationic surfactant can be included at about 3%, by weight, of the liquid concentrated surfactant composition.

As can be appreciated, non-ionic surfactants are generally compatible with both anionic surfactants and cationic surfactants as they lack an ionic charge. Accordingly, any known non-ionic surfactants can generally be suitable for the liquid concentrated surfactant compositions described herein. Preferred non-ionic surfactants are those which can be supplied as an about 100%, by weight, surfactant and be liquid at room temperature (e.g., at about 23° C.).

In certain embodiments, suitable non-ionic surfactants can include alkoxylates, and preferably ethoxylates, of long-chain, aliphatic, synthetic or native alcohols having a $C_8$-$C_{22}$ alkyl radical. In certain embodiments, the non-ionic surfactants can include between about 1 mol to about 25 mols of ethylene oxide. The alkyl chains of the aliphatic alcohols can be linear or branched, primary or secondary, and saturated or unsaturated.

Additional examples of suitable non-ionic surfactants can include alkyl phenol ethoxylates, tallow amine ethoxylates, ether amine ethoxylates, ethylene oxide/propylene oxide block copolymers, amide ether condensates, alkyl polyglucoside, and cocoamine ethoxylates as known in the art.

Particularly preferred non-ionic surfactants can include linear alkyl alcohol ethoxylates in certain embodiments. Examples of such non-ionic surfactants include $C_8$-$C_{16}$ linear alkyl alcohol ethoxylates having an average of 1 mol to 10 mols of ethylene oxide. Such non-ionic surfactants are commercially marketed by the Pilot Chemical Co. (Cincinnati, OH) under the trade name Masodol®.

In certain embodiments, the liquid concentrated surfactant compositions described herein can generally include about 20% to about 60%, by weight, of non-ionic surfactants including any amounts between about 20% to about 60%, by weight, such as about 25% to about 50%, by weight, about 30% to about 45%, by weight, and about 35% to about 45%, by weight.

As can be appreciated, the substantial, or entire, elimination of water presents numerous benefits for the liquid concentrated surfactant compositions described herein. For example, the elimination of inert materials such as water reduces the cost and environmental impact of transporting, and storing, inert material. The liquid concentrated surfactant compositions can also be more effective for their given weight.

In certain embodiments, the liquid concentrated surfactant compositions can be a low viscosity, amber-colored, liquid in certain embodiments. The liquid concentrated surfactant compositions can be uniform, or isotropic, fluids. The low viscosity of the liquid concentrated surfactant composition can be advantageous as such viscosities can facilitate handling and use of the composition. For example, the viscosity is amenable to pumping and pouring of the liquid concentrated surfactant composition.

In certain embodiments, the liquid concentrated surfactant compositions can have a dynamic viscosity of about 100,000 cP or less, a dynamic viscosity of about 50,000 cP or less, a dynamic viscosity or about 10,000 cP or less, a dynamic viscosity of about 5000 cP or less, a dynamic viscosity of about 1,000 cP or less as well as any dynamic viscosities within such ranges such as a dynamic viscosity of about 100 cP to about 2,000 cP or a dynamic viscosity of about 150 cP to about 1,000 cP.

Generally, the liquid concentrated surfactant composition can be stored in any suitable container or apparatus. For example, suitable containers and apparatuses include including single use containers or apparatuses, refillable containers or apparatuses, and refills thereof. In more specific examples, suitable containers and apparatuses include: aerosol containers, metal bottles, metal cans, ampoules, antistatic bag, bag-in-boxes, bags and flexible containers, barrel, biodegradable bags, blister packs, boil-in-bags, bottles, boxes, bulk boxes, cages, cases, carboys, cartons, chubs, clamshells, corrugated box designs, crates, disposable cups, drums, endcaps, flexible intermediate bulk containers, folding cartons, glass bottles, insulated shipping containers, intermediate bulk containers, jars, jerrycans, jugs, kegs, multi-packs, oyster pails, packets (container), padded mailers, pails, paper bags, paper sacks, plastic bags, plastic bottles, retort pouches, sachets, security bags, shipping containers, skin pack, spray bottles, Tetra Briks®, tin cans, thermal bags, pressurized aerosol cans, tubs (container), tubes, unit loads, vials, wooden boxes, and the like. The containers and apparatuses can include storage for additional components such as additional liquids, solids, or gases that can be simultaneously applied or used. Additionally, the containers and apparatuses can also, or alternatively, include accessories such as hoses, applicator pads, and the like.

In certain aspects of the disclosure, the container or apparatus can include one or more application systems to apply the liquid concentrated surfactant composition. For example, the container or apparatus can include one or more of a nozzle and nebulizer. Suitable nozzles can include, single-fluid nozzles, plain-orifice nozzles, shaped-orifice nozzles, surface-impingement single-fluid nozzles, pressure-swirl single-fluid spray nozzle, solid-cone single-fluid nozzles, compound nozzles, two-fluid nozzles, internal-mix two-fluid nozzles, external-mix two-fluid nozzles, control of two-fluid nozzles, rotary atomizers, ultrasonic atomizers and electrostatic atomizers. Suitable nebulizers include mechanical nebulizers, soft mist inhalers, electrical nebulizers, jet nebulizers, ultrasonic wave nebulizers and vibrating mesh technology nebulizers. Aerosol nozzles can include a paint valve system having a "female" valve with the stem being part of the top actuator. The valve can be preassembled with the valve cup and installed on the can as one piece, prior to pressure-filling. The actuator can be added later.

The containers or apparatuses can be pressurized in certain embodiments using, for example, an inert gas. Alternatively, the containers or apparatuses can be pressurized electronically or by a chemical reaction.

In certain embodiments, the liquid concentrated surfactant composition can be included in a single-use dissolvable packet or "pod" for laundry or dishwashing purposes. As can be appreciated, the lack of water or solvent in the liquid concentrated surfactant compositions can be particularly advantageous for size and weight considerations for such uses.

In certain embodiments, the liquid concentrated surfactant compositions can have a substantially neutral pH (e.g., about 7 to about 8) when dispersed in water at a concentration of 10%, by weight, of the liquid concentrated surfactant composition. As can be appreciated, having a neutral pH can be advantageous for safety and compatibility reasons. For example, having a neutral pH can mean that the liquid concentrated surfactant composition can be used with other non-neutral (e.g., acidic or basic) cleaning compositions. The neutral pH can also prevent chemical burns to users and damage to substrates which the liquid concentrated surfactant compositions are applied to.

It has been discovered that highly concentrated surfactant compositions exhibit numerous benefits compared to non-concentrated (e.g., about 50% or less concentrated) or even conventionally known highly concentrated surfactant compositions (having e.g., about 90% or less surfactant). For example, the liquid concentrated surfactant compositions described herein exhibit rapid dispersion in water while known highly concentrated surfactant compositions having a surfactant concentration of 90%, by weight, or less can be difficult to disperse in water.

The liquid concentrated surfactant compositions disclosed herein can be useful as a cleaning composition for household, industrial, and institutional applications as they demonstrate a variety of useful properties. For example, liquid concentrated surfactant compositions can exhibit excellent particulate and oily soil removal, instant wetting, emulsification and grease cutting properties, clear D'limonene microemulsions for heavy duty cleaners, low viscosity for easy handling and storage, be preservative free, and be biodegradable.

In certain embodiments, the liquid concentrated surfactant compositions can be useful for detergents, laundry compositions for both household and institutional cleaning, hard surface cleaners, emulsifiers, fine fabric washing compositions, laundry pre-spotter compositions, carpet shampoo compositions, textile scour compositions, manual and automatic dishwashing compositions, pots and pans cleaners, car wash compositions including manual or bucket-type car wash compositions and automatic car wash compositions, plastic and vinyl cleaner compositions, leather cleaner compositions, glass cleaner compositions, metal cleaners, wood cleaner compositions, marble cleaners, concrete cleaners, air-entrapment for cement, all-purpose cleaner compositions, kitchen cleaner and stripper, kitchen degreaser compositions, kitchen counter cleaners, tub and tile cleaners, bathroom cleaners, toilet bowl cleaners, floor cleaners, floor strippers, heavy duty industrial cleaners, dairy cleaners, food processing plant cleaners, degreaser compositions, agricultural emulsifiers including pesticide emulsifiers, emulsion polymerization compositions, D'limonene microemulsions, perfume solubilizers, and oilfield foaming compositions. As can be appreciated however, the liquid concentrated surfactant compositions disclosed herein can be suitable for other cleaning uses as known in the art.

In certain embodiments, the liquid concentrated surfactant composition can be used as an intermediate component of a larger cleaning product or composition. For example, the liquid concentrated surfactant composition can be used to formulate concentrated (e.g., 2 x, 3 x, 4 x, or greater) dishwashing soap in certain embodiments. In other certain embodiments, the liquid concentrated surfactant composition can be used as a surfactant blend for any other household, industrial, or institutional cleaning product. In yet other certain embodiments, the concentrated surfactant blend can be used as a surfactant blend for paints, oils, emulsions, metal working fluids, oilfield operations, foaming applications, and the like.

In certain embodiments, the liquid concentrated surfactant compositions can be compatible with various additives. For example, builders, fillers, enzymes, bleaching agents, chelating agents, couplers, dispersing agents, soil-capturing agents, pH agents, electrolytes, polymers (e.g., polycarboxylates, ethoxylated polyethyleneimines), anti-foam agents, fragrances, colorants, hard water modifiers, optical brighteners (e.g., fluorescent dyes), and drying agents can be added as suitable additives.

In certain embodiments, examples of suitable additives can include one or more of propylene glycol and amphoteric surfactants. For example, propylene glycol can be included in the concentrated liquid surfactants compositions described herein as a dispersant, as a viscosity modifier, and/or as a low temperature stability enhancer.

Amphoteric surfactants can be useful to improve coupling, improve hydrotroping, and/or to improve dispersing of the concentrated liquid surfactant compositions. At a neutral pH, it is generally believed that a variety of amphoteric surfactants can be suitable as such amphoteric surfactants will increase stability of the liquid concentrated surfactant composition rather than decrease stability. In certain embodiments, a suitable amphoteric surfactant can be sodium lauriminodipropionate.

In certain embodiments, viscosity modifiers can be included as an additive. Such additives are particularly useful when the liquid concentrated surfactant compositions are diluted with water to, for example, form a cleaning product. Generally, known viscosity modifiers can be suitable. It has been found that particularly suitable viscosity modifiers can include hydrophobically modified acrylate polymers and myristyl dimethylamine oxide.

For example, to increase the viscosity of a diluted solution containing a liquid concentrated surfactant composition with greater than 80% water and having a low initial viscosity, a hydrophobically modified acrylate polymer solution can be included at about 1% to about 5% by weight. At moderate dilutions of about 50% to about 80% water, hydrophobically modified acrylate polymers or myristyl dimethylamine oxide can be used to increase viscosity. At low dilutions of between 20% to 40% water, the initial viscosity of a liquid concentrated surfactant composition can be a gel. To break the gel, and to lower the viscosity, about 1% to about 5% propylene glycol can be added. At very low dilutions of between 5% to about 15% water, myristyl dimethylamine oxide at levels of about 1% to about 5% can be used to increase the viscosity.

The addition of additives can be particularly useful when the liquid concentrated surfactant compositions are intended for direct application without being incorporated into a larger cleaning composition or product or to improve various other properties such as storage stability.

In certain embodiments, the liquid concentrated surfactant compositions can be substantially, or entirely, free of any preservatives. As can be appreciated, the lack of a need to include a preservative can be beneficial for compatibility with other components as well as for health reasons.

Generally, the liquid concentrated surfactant compositions can be formed by mixing each of the surfactants together with conventional mixing equipment until a homogenous mixture is formed.

Exemplary Cleaning Formulations

Exemplary formulations for various cleaning products formed using the liquid concentrated surfactant compositions are described herein. In each exemplary formulation, each of the components is added in the order listed with constant mixing. Mixing is performed after each component is added and then continued at the end under a smooth, homogenous composition is formed that is free of lumps and particles. The pH is adjusted to a pH of about 8-9 with either citric acid or sodium hydroxide.

Laundry Detergent for a Laundry "Pod"

| Component | % w/w |
|---|---|
| Liquid Concentrated Surfactant Composition | to 100% |
| Propylene Glycol | 5.0 |
| Commercial Protease Enzyme | 2.0 |
| Commercial Mannanase Enzyme | 1.0 |
| Perfume and dye | Q.S. |

High Performance—Liquid Laundry Detergent

| Component | % w/w |
|---|---|
| Water | to 100% |
| Oleic Acid | 6.0 |
| 50% Sodium Hydroxide Solution | 1.7 |
| Liquid Concentrated Surfactant Composition | 32.0 |
| Sodium Citrate | 2.0 |
| Propylene Glycol | 5.0 |
| Sodium Formate | 1.0 |
| Optical Brightener | 0.05 |
| Commercial Hydrophobic Modified Copolymer | 1.0 |
| Commercial Nonionic Soil Release Polymer | 1.0 |
| Commercial Enzyme Solution | 3.0 |
| Preservative, Perfume, Dye | Q.S. |

Standard Liquid Laundry Detergent

| Component | % w/w |
|---|---|
| Water | to 100% |
| Hydrophobically Modified Acrylate Polymer | 2.0 |
| 10% Sodium Hydroxide Solution | 1.0 |
| Liquid Concentrated Surfactant Composition | 22.0 |
| Sodium Citrate | 3.0 |
| Optical Brightener | 0.05 |
| Commercial Hydrophobic Modified Copolymer | 1.0 |
| Preservative, Perfume, Dye | Q.S. |

Economical Liquid Laundry Detergent

| Component | % w/w |
|---|---|
| Water | to 100% |
| Hydrophobically Modified Acrylate Polymer | 2.0 |
| 10% Sodium Hydroxide Solution | 1.0 |
| Liquid Concentrated Surfactant Composition | 12.0 |
| Sodium Citrate | 2.0 |
| Preservative, Perfume, Dye | Q.S. |

Concentrated Laundry Detergent (5 X)

| Component | % w/w |
|---|---|
| Water | to 100% |
| Sodium Citrate | 3.0 |
| Liquid Concentrated Surfactant Composition | 60.0 |
| Propylene Glycol | 5.0 |
| Optical Brightener | 0.1 |
| Commercial Enzyme Solution | 5.0 |
| Preservative, Perfume, Dye | Q.S. |

Tube and Tile Cleaner

| Component | % w/w |
|---|---|
| Water | to 100% |
| Liquid Concentrated Surfactant Composition | 1.0 |
| Citric Acid | 1.0 |
| Sodium Citrate | 1.0 |
| Preservative, Perfume, Dye | Q.S. |

All-Purpose Cleaner

| Component | % w/w |
|---|---|
| Water | to 100% |
| Liquid Concentrated Surfactant Composition | 3.0 |
| Sodium Citrate | 1.0 |
| Sodium Carbonate | 1.0 |
| Glycol Ether | 3.0 |
| Preservative, Perfume, Dye | Q.S. |

Heavy Duty Industrial Cleaner and Degreaser

| Component | % w/w |
|---|---|
| Water | to 100% |
| Liquid Concentrated Surfactant Composition | 10.0 |
| D'limonene | 5.0 |
| Glycol Ether | 5.0 |
| Preservative, Perfume, Dye | Q.S. |

Each of the exemplary cleaners demonstrated equal, or better, performance than comparative commercial products using industry standard evaluative tests such as the HCPA DCC-17, Tough Greasy Soil Test Method. For example, the Tub and Tile Cleaner exhibited a Percent Soil Removal Test result of 98.6% compared to values of commercial products ranging 4.9% to 98.1% when evaluated using the ASTM D5343 Soap Scum evaluative test.

Examples

Various example liquid concentrated surfactant compositions were produced to evaluate their cleaning ability. Each of the example compositions was formed by mixing all of the components in a suitable container with constant mixing until a clear, isotropic, and homogenous batch was produced.

Physical and Evaluative Tests pH Measurements

The pH of the example compositions was evaluated using a Symphony B-10 P pH meter manufactured by VWR Scientific (Radnor, PA). Measurements were performed in accordance to manufacturer standards. The example compositions were diluted with water to form a 10% aqueous solution.

Foam Height

Foam height of the example compositions was evaluated using a 1% solution of the evaluated composition. Measurements were performed in accordance to the Ross-Miles method (ASTM D 1173) and are reported as initial, after 5 minutes, and after 10 minutes.

Wetting Time

Wetting time measurements of the example compositions were evaluated using a 1% solution of the evaluated composition and cotton skeins. Measurements were performed in accordance to the Draves Wetting test.

Viscosity Measurements

The viscosity of the example compositions was determined using a Brookfield LV viscometer manufactured by Brookfield Ametek (Middleboro, MA). Viscosity was measured using spindle #3 at a speed of 20 RPM at a temperature of 25° C.

Percent Solids Measurements

The percentage of solids in the example compositions was determined using an Ohaus MB-45 moisture balance manufactured by Ohaus Corp. (Parsippany, NJ). Measurements were performed in accordance to manufacturer standards.

Soil Removal Test

The soil removal ability of the example compositions was determined by laundering sample swatches coated with clay, dust sebum, make-up, grass, cran-grape juice, spaghetti sauce, mud, coffee, cocoa, and blood/milk/ink in an independent laboratory (Sterling Labs, Sylvania, OH). All reflectance values were measured using a Photovolt 577 Reflectometer manufactured by Photovolt Instruments (Minneapolis, MN) with a green tri-stimulus filter.

Sample swatches coated with clay, dust sebum, make-up, and grass were prepared by applying the soil to clean cotton swatches produced by Eidgenôssische Materialprûfungs- and Forschungsanstalt (hereinafter, "EMPA") of Dithendorf, Switzerland) (translated, the "Swiss Federal Laboratories for Materials Science and Technology"). The clay, dust sebum, make-up, and grass were obtained from Scientific Services S/D Inc. (Sparrowbush, NY). Sample swatches coated with cran-grape juice, spaghetti sauce, mud, and coffee were prepared using lab-supplied soils and sample swatches from Scientific Services S/D Inc. Presoiled swatches soiled with cocoa and blood/milk/ink were obtained from EMPA as EMPA 112 and EMPA 116 swatches.

The reflectance of the unsoiled swatches and subsequently soiled swatches were measured.

To launder, three soiled swatches of each soil were washed in a GE Model GTW330ASK0WW washing machine with sufficient sample amounts of each test product for a medium wash load (15 gallons). The water in each test load was adjusted to have a water hardness of 150 ppm using concentrates of magnesium and calcium chloride at a ratio of 1 Mg to 2 Ca. The samples were run at 32.2° C. (90° F.) for a normal cycle length of 12 minutes. Swatches were pressed dry using the permanent press setting. Following drying, the reflectance of each sample was measured using the same machine and procedure as the swatches prior to laundering.

The soil removal percentage was calculated by comparing the reflectance values of each unsoiled swatch to the reflectance value of the soiled swatch and washed swatch. The results were averaged for each set of replicates and then totaled for each example composition. The higher the value, the better the cleaning of the example composition. The difference between the averages that was statistically significant at the 95% confidence level was also determined.

Table 1 depicts the components, by weight percentage, used to form Examples 1 to 9. The monoisopropanolamine or monoethanolamine was added at levels sufficient to adjust the pH of the example compositions to a pH of about 7 to about 8. The monoisopropanolamine or monoethanolamine also substantially converted the linear alkyl benzene sulfonic acid to linear alkyl benzene sulfonate in the example compositions.

Examples 1 to 3 evaluated the effect of varying the ratio of anionic surfactants to nonionic surfactants. Example 4 evaluated the difference between a low hydrophilic-lipophilic balance ("HLB") non-ionic surfactant and a high HLB non-ionic surfactant. Example 5 evaluated the difference between a sodium linear alkylbenzene sulfonate salt and a monoisopropanolamine linear alkylbenzene sulfonate salt. Example 6 evaluated the effect of including a hydrophilic cationic surfactant. Example 7 evaluated the effect of including a low HLB non-ionic surfactant, a high HLB non-ionic surfactant, and a hydrophilic cationic surfactant. Example 8 compared the difference between a monoethanolamine linear alkylbenzene sulfonate salt and a monoisopropanolamine linear alkylbenzene sulfonate salt. Example 9 evaluated the effect of adding a hydrotrope, coupler, and dispersant.

Examples 10 and 11 were commercial liquid concentrated surfactant compositions and used as is. Example 10 was 91% actives and included triethanolamine dodecyl benzene sulfonate, nonylphenol ethoxylate, sodium laureth sulfate, and cocamide diethanolamine. Example 11 was 100% active and included a proprietary blend of anionic surfactants and amide surfactants.

TABLE 1

| Component | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| $C_{11}$ Alcohol Ethoxylate (Avg. 7 mols of EO) | 47.3 | 27.3 | 67.2 | 37.8 | 15.8 | 37.8 | 28.4 | 49.8 | 42.6 |
| Monoisopropanolamine | 10.7 | 14.7 | 6.6 | 8.5 | — | 8.5 | 6.4 | — | 9.6 |
| Linear Alkyl Benzene Sulfonic Acid (99% active) | 42.0 | 58.0 | 26.2 | 33.6 | 14.0 | 33.6 | 25.2 | 42.0 | 37.8 |
| $C_{11}$ Alcohol Ethoxylate (Avg. 3 mols of EO) | — | — | — | 20.0 | — | — | 20.0 | — | — |
| Sodium Hydroxide (50% active) | — | — | — | — | 3.7 | — | — | — | — |
| PEG-15 Cocomonium Chloride (95% active) | — | — | — | — | — | 20.0 | 20.0 | — | — |
| Monoethanolamine | — | — | — | — | — | — | — | 8.2 | — |
| Propylene Glycol | — | — | — | — | — | — | — | — | 10.0 |
| D.I. Water | — | — | — | — | 66.5 | — | — | — | — |

Table 2 depicts the results of evaluating Examples 1 to 11 with the Soil Removal Test.

TABLE 2

| Swatch | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Sig. Dif. |
|---|---|---|---|---|---|---|---|---|---|---|---|---|
| Cocoa (EMPA 112) | 6.6 | 8.3 | 11.1 | 14.3 | 6.2 | 8.8 | 9.1 | 8.9 | 8.9 | 17.3 | 15.4 | 5.9 |
| Blood/milk/ink (EMPA 116) | 20.7 | 18.1 | 22.4 | 21.8 | 21.9 | 24.1 | 20.7 | 20.2 | 21.7 | 26.1 | 12.7 | 3.5 |
| Coffee | 52.1 | 54.8 | 55.2 | 54.8 | 52.7 | 56.2 | 53.5 | 55.9 | 60.9 | 57.0 | 52.4 | 9.1 |
| Clay | 59.5 | 57.4 | 60.5 | 59.2 | 58.8 | 64.4 | 62.9 | 64.5 | 68.4 | 61.6 | 47.8 | 7.1 |
| Dust sebum | 62.3 | 60.3 | 68.3 | 60.4 | 64.4 | 69.9 | 58.9 | 60.5 | 61.3 | 64.0 | 40.6 | 7.3 |
| Grass | 65.8 | 50.3 | 63.0 | 55.5 | 73.0 | 65.7 | 70.2 | 60.0 | 67.8 | 77.0 | 15.1 | 9.3 |
| Cran-grape juice | 66.6 | 70.6 | 63.2 | 65.3 | 73.3 | 72.6 | 64.5 | 71.1 | 66.8 | 72.9 | 67.2 | 9.2 |
| Spaghetti sauce | 80.9 | 81.9 | 80.7 | 83.1 | 85.1 | 80.0 | 82.0 | 87.6 | 85.6 | 85.5 | 77.9 | 4.8 |
| Mud | 93.7 | 93.6 | 90.4 | 91.0 | 93.9 | 93.3 | 92.0 | 91.5 | 87.5 | 90.7 | 89.1 | 3.4 |
| Make-up | 93.8 | 84.3 | 84.6 | 87.3 | 92.2 | 84.7 | 82.6 | 89.3 | 82.0 | 77.4 | 81.2 | 8.3 |
| Total | 602.0 | 579.6 | 599.4 | 592.7 | 621.5 | 619.7 | 596.4 | 609.5 | 610.9 | 629.5 | 499.4 | — |
| % of Best | 96% | 92% | 95% | 94% | 99% | 98% | 95% | 97% | 97% | 100% | 79% | — |

As depicted by Table 2, Examples 6 and 7, included a hydrophilic cationic surfactant and formed of nearly 100%, by weight, surfactant performed extremely well at removing a variety of soils. In addition to high performance at soil removal, examples 6 and 7 are expected to exhibit unique properties from the inclusion of the hydrophilic cationic surfactant.

Table 3 depicts further examples of liquid concentrated surfactant compositions. In Table 3, Examples 12 to 14 were formed by combining the components in the order that they are presented in Table 3 with continuous mixing. Following addition of linear alkyl benzene sulfonic acid, the pH was adjusted to a pH of about 7 to about 9 through further addition of either monoisopropanolamine or linear alkyl benzene sulfonic acid. Following pH adjustment, the remaining components were added in the order listed in Table 3 with constant mixing until a clear, smooth, and homogeneous batch was formed that was free of lumps, particles, or gel spots.

TABLE 3

| Component | Ex. 12 | Ex. 13 | Ex. 14 |
|---|---|---|---|
| $C_{11}$ Alcohol Ethoxylate (Avg. 7 mols of EO) | 41.15 | 42.10 | 37.84 |
| Monoisopropanolamine | 9.31 | 9.52 | 8.56 |
| Linear Alkyl Benzene Sulfonic Acid (99% active) | 36.54 | 37.38 | 33.6 |
| Propylene Glycol | 5.00 | 5.00 | — |
| PEG-15 Cocomonium Chloride (95% active) | 5.00 | 3.00 | 20.0 |
| Sodium Lauriminodipropionate (30% active) | 3.00 | 3.00 | 5.00 |

Table 4 depicts the results of testing Examples 12 to 14 in a manner similar to Examples 1 to 11 in Table 2.

TABLE 4

| Swatch | Ex. 12 | Ex. 13 | Ex. 14 | Sig. Dif. |
|---|---|---|---|---|
| Cocoa (EMPA 112) | 5.2 | 2.4 | 7.3 | 2.1 |
| Blood/milk/ink (EMPA 116) | 16.6 | 18.9 | 18.2 | 1.5 |
| Coffee | 49.1 | 52.9 | 52.3 | 3.5 |

TABLE 4-continued

| Swatch | Ex. 12 | Ex. 13 | Ex. 14 | Sig. Dif. |
|---|---|---|---|---|
| Clay | 56.3 | 60.9 | 60.2 | 4.3 |
| Dust sebum | 64.8 | 63.5 | 63.2 | 5.0 |
| Grass | 20.1 | 18.9 | 21.5 | 6.9 |
| Cran-grape juice | 64.9 | 59.8 | 59.8 | 5.7 |
| Spaghetti sauce | 71.2 | 74.4 | 73.0 | 6.7 |
| Mud | 86.8 | 86.7 | 88.4 | 3.3 |
| Make-up | 82.2 | 83.9 | 82.5 | 4.7 |
| Total | 517.2 | 522.3 | 526.4 | — |
| % of Best | 98% | 99% | 100% | — |

As seen by the results of Table 4, each of Examples 12 to 14 performed similarly at the removal of soils and were advantageous compositions.

The physical properties of Example 13 were further evaluated and are depicted in Table 5. Table 6 further depicts the temperature and viscosity dependency of Example 13.

TABLE 5

| Property | Measurement |
|---|---|
| Appearance (25° C.) | Clear, amber colored liquid |
| Color (Klett, 5%, 40 mm) | 7.0 |
| Percents Solid (%) | 95%-100% |
| Odor | Mild |
| pH | 7-8 |
| Foam Height (mm) | 172/162/161 |
| Wetting Time (s) | Instant |
| Cloud Point (° C.) | −5.2 |
| Pour Point (° C.) | −2.7 |
| Freeze Point (° C.) | −24.1 |
| Density (lbs/gal) | 8.7 |
| Solubility in Water | Soluble |

TABLE 6

| Temperature (° F.) | Viscosity (cP) |
|---|---|
| 40 | 5280 |
| 50 | 1000 |
| 60 | 650 |
| 70 | 470 |
| 80 | 350 |

TABLE 6-continued

| Temperature (° F.) | Viscosity (cP) |
|---|---|
| 90 | 280 |
| 100 | 200 |

As depicted by Tables 5 and 6, the physical properties of Example 13 are desirable for a large number of home care, industrial, and institutional cleaning applications.

As can be appreciated, it can be necessary to adjust the viscosity of a composition for various applications. For example, laundry detergents typically have a viscosity of about 100 cP to about 500 cP while manual dish was detergents can have a viscosity of about 400 cP to about 800 cP. FIG. 1 depicts a graph illustrating the viscosity of Example 13 as a function of the ratio of water to Example 13, by weight.

Experiments to determine if the viscosity of the dilute solutions depicted in FIG. 1 could be modified were performed. A description of how to modify the viscosity at various dilutions are reported in Table 7.

TABLE 7

| Dilution Amount (% of Example 13) | Viscosity Modification |
|---|---|
| High Dilution (<20%) | Initial low viscosity can be increased by addition of a hydrophobically modified acrylate polymer at 1% to 5% and adjusting the pH to 7 to 9. |
| Moderate Dilution (20% to 50%) | Initial low viscosity can be increased by addition of a hydrophobically modified acrylate polymer or by addition of myristyl dimethylamine oxide at 1% to 5%. |
| Low Dilution (60% to 80%) | Initial gelled velocity. To break the gel and lower viscosity, 1% to 5% propylene glycol can be added. |
| Very Low Dilution (85% to 95%) | Initial low viscosity can be increased by addition of myristyl dimethylamine oxide at 1% to 5%. |

The compatibility of Example 13 to various additives was also evaluated by preparing a 5% w/w solution of Example 13 in deionized water. Subsequently, various additives including acids, alkalis, and salts were added to a 100 g aliquot of the 5% w/w solution until the solution turned cloudy. The amount of additive that turned the mixture cloudy and the pH of the final solution are depicted in Table 8.

TABLE 8

| Additive | Amount of additive that turned the mixture cloudy | Final pH of the mixture |
|---|---|---|
| Sodium Hydroxide 50% Solution | 4.4 g | 13.3 |
| Monoisopropanolamine | 100 g (Mixture still clear) | 11.9 |
| Sodium carbonate Anhydrous 25% Solution | 15.3 g | 10.4 |
| TKPP 50% Solution | 6.9 g | 9.01 |
| Tetrasodium EDTA 33.3% Solution | 25.9 | 9.8 |
| Sodium Metasilicate Anhydrous 20% Solution | 25.5 | 12.9 |
| Hydrochloric Acid 37% | 1.8 g | 0.9 |
| Phosphoric Acid 85% | 15.0 g | 0.6 |

TABLE 8-continued

| Additive | Amount of additive that turned the mixture cloudy | Final pH of the mixture |
|---|---|---|
| Citric Acid 25% Solution | 100 g (Mixture still clear) | 1.5 |

As depicted in Table 8, Example 13 is compatible with a number of common cleaning agents, additives, and modifiers.

Table 9 depicts an example of a liquid concentrated surfactant composition which exhibits lowered amounts of dioxane (e.g., 1,4 dioxane). Example 15 was formed by combining the components in the order that they are presented in Table 9 with continuous mixing. Following addition of linear alkyl benzene sulfonic acid, the composition was cooled to a temperature of about 40° C. and the pH was adjusted to a pH of about 7.0 to about 8.0 through further addition of either monoisopropanolamine or linear alkyl benzene sulfonic acid. Following pH adjustment, the remaining components were added in the order listed in Table 9 with constant mixing until a clear, smooth, and homogeneous batch was formed that was free of lumps, particles, or gel spots. Similar compositions can also be formed by replacing the propoxylated quaternary ammonium with propoxylated amines.

TABLE 9

| Component | Ex. 15 |
|---|---|
| $C_{11}$ Alcohol Ethoxylate (Avg. 7 mols of EO) | 44.50 |
| Monoisopropanolamine | 10.05 |
| Linear Alkyl Benzene Sulfonic Acid (99% active) | 39.45 |
| Propylene Glycol | 4.25 |
| Propoxylated Quaternary Ammonium | 1.75 |

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. Certain embodiments disclosed herein can be combined with other embodiments as would be understood by one skilled in the art. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A liquid composition comprising:

one or more anionic sulfonated surfactants comprising a salt of a linear or branched alkyl benzene sulfonic acid formed with a neutralizing agent comprising monoisopropanolamine;

one or more non-ionic surfactants; and about one or more hydrophilic cationic surfactants comprising a quaternary ammonium formed from a polyethylene glycol derivative of cocamine; and wherein about 90%, by weight, or more of the composition comprises the one or more anionic sulfonated surfactants, the one or more non-ionic surfactants, and the one or more hydrophilic cationic surfactants.

2. The liquid composition of claim 1, comprises about 0.5% to about 5%, by weight, of the one or more hydrophilic cationic surfactants.

3. The liquid composition of claim 1, wherein the one or more non-ionic surfactants comprise a $C_8$-$C_{16}$ linear alkyl alcohol ethoxylate, the $C_8$-$C_{16}$ linear alkyl alcohol ethoxylate having an average of about 3 mol to about 10 mols of ethylene.

4. The liquid composition of claim 1, comprises:

linear alkyl benzene sulfonate;

cocoalkylmethyl PEG-15 ammonium chloride; and a $C_8$-$C_{16}$ linear alkyl alcohol ethoxylate.

5. The liquid composition of claim 1, comprises:

about 30% to about 45%, by weight, of the one or more anionic sulfonated surfactants;

about 1% to about 5%, by weight, of the one or more hydrophilic cationic surfactants; and about 35% to about 50%, by weight, of the one or more non-ionic surfactants.

6. The liquid composition of claim 1, comprises about 35% to about 45%, by weight, of linear alkyl benzene sulfonate;

about 1% to about 3%, by weight, of propoxylated quaternary ammonium or propoxylated quaternary amine; and about 40% to about 50%, by weight, of a $C_8$-$C_{16}$ linear alkyl alcohol ethoxylate.

7. The liquid composition of claim 1 further comprising one or more additives; and wherein the one or more additives comprising one or more of propylene glycol and an amphoteric surfactant, the amphoteric surfactant comprising sodium lauriminodipropionate.

8. The liquid composition of claim 7 comprising about 3% to about 5%, by weight, of the amphoteric surfactant; and about 5% to about 35%, by weight, of the propylene glycol.

9. The liquid composition of claim 1 has a dynamic viscosity of about 100 cP to about 2,000 cP.

10. The liquid composition of claim 1 has a pH of about 7 to about 8 when dispersed in deionized water at a concentration of 10%, by weight, of the liquid composition.

11. The liquid composition of claim 1 consists essentially of surfactants.

12. A liquid composition consisting essentially of:

an anionic sulfonated surfactant comprising a salt of a linear or branched alkyl benzene sulfonic acid formed with a neutralizing agent comprising monoisopropanolamine;

a non-ionic surfactant;

a hydrophilic cationic surfactant comprising a quaternary ammonium formed from a polyethylene glycol derivative of cocamine; and optionally one or more of propylene glycol and an amphoteric surfactant; and wherein about 90% or more, by weight, of the liquid composition comprises surfactants.

13. A method of forming a liquid composition comprising:

mixing together until substantially clear and homogenous:

one or more anionic sulfonated surfactants, formed by reacting an anionic sulfonic acid with a neutralizing agent comprising monoisopropanolamine;

one or more non-ionic surfactants; and one or more hydrophilic cationic surfactants comprising a quaternary ammonium formed from a polyethylene glycol derivative of cocamine; and wherein the liquid composition comprises about 90% or more, by weight, of the surfactants.

14. The liquid composition of claim 1 comprising a residual amount of monoisopropanolamine.

15. The liquid composition of claim 12 comprising a residual amount of monoisopropanolamine.

16. The method of claim 13, wherein the liquid composition comprises a residual amount of monoisopropanolamine.

* * * * *